United States Patent [19]

Warren

[11] Patent Number: 4,523,349
[45] Date of Patent: Jun. 18, 1985

[54] CRAB MEAT EXTRACTOR AND METHOD OF EXTRACTION

[76] Inventor: Wiley W. Warren, Rte. 4, Box 571, Washington, N.C. 27889

[21] Appl. No.: 525,742

[22] Filed: Aug. 23, 1983

[51] Int. Cl.³ ............................................ A22C 29/02
[52] U.S. Cl. ........................................ 17/46; 17/71; 17/48
[58] Field of Search .................. 17/71, 53, 51, 73, 64, 17/46, 48

[56] References Cited

U.S. PATENT DOCUMENTS

| | | | |
|---|---|---|---|
| 1,080,982 | 12/1913 | Knapp | 17/64 |
| 2,879,538 | 3/1959 | Peuss | 17/73 X |
| 3,020,583 | 2/1962 | Lapeyre et al. | 17/71 |
| 3,151,351 | 10/1964 | Reinke | 17/71 X |
| 3,203,039 | 8/1965 | Glidden et al. | 17/71 X |
| 3,251,091 | 5/1966 | Altman | 17/71 |
| 3,325,856 | 6/1967 | Pack et al. | 17/71 |
| 3,388,422 | 6/1968 | Benoit | 17/71 |
| 3,777,332 | 12/1973 | Boisvert | 17/71 |
| 3,921,256 | 11/1975 | Huebotter | 17/71 |
| 4,004,321 | 1/1977 | Harrison | 17/71 X |
| 4,083,084 | 4/1978 | Davis | 17/73 |
| 4,202,077 | 5/1980 | Martin, Sr. | 17/73 |

FOREIGN PATENT DOCUMENTS 10590 12/1958 Japan ...................................... 17/73

Primary Examiner—Willie G. Abercrombie
Attorney, Agent, or Firm—William T. Hough

[57] ABSTRACT

In a preferred embodiment, for a method of extracting crab meat from the under-shell once the top shell is removed and after washing, the meat-containing under-shell is fed into the bite of pincher rolls after first adjusting the parallel axes of the pincher rolls to an angle of about 75 degrees as measured from a horizontal, and as the meat is thereby squeezed-out in a direction forward of the pincher rolls and slides downwardly, the extracted meat is collected by use of a converging guide member beneath the bite position at a base of the pincher rolls guiding the meat to a collection vessel, the pincher rolls being supported on a support structure with one roll pivoted toward the other and held in a predetermined position such that the meat-containing crab-shell is compressible therebetween and dragged through the bite behind which the debris-residual meatless shell is permitted to fall away into a trash-collecting vessel, the opposing rolls revolving surfaces each being cleaned by a counter-revolving brush for each roll and a roll-surface scraper for each roll, the brushes and scrapers being likewise mounted on the support structures, and the pincher rolls being driven directly or indirectly by a driver mechanism, and the revolvable brushes being driven by driving connectors to the pincher rolls, and after meat is collected, it is subjected to steaming.

25 Claims, 7 Drawing Figures

CRAB MEAT EXTRACTOR AND METHOD OF EXTRACTION

This invention is directed to a novel crab-meat extractor method of extracting crab-meat from under-shell of a crab.

BACKGROUND

Prior to the present invention, as a practical matter the crab commercial industry has continued to rely principally on the slow, time-consuming laborious and expensive manual meat-picking methods and utensils used down through the centuries. This has been and is true because of the lack of any practical and/or effective equipment that might be used as a reasonable substitute. This is true even though there exist various patents to mechanism that because of not satisfying the above-noted needs of practicality, cost savings, effectiveness and the like have not provided the needed relief in the crab industry, whereby meat-production has remained very low and the cost of crab-meat has remained very high.

Typical U.S. patents include the Reinke U.S. Pat. No. 3,151,351 directed to adjustable crab-holding mechanisms on movable workstations for manual-working on crabs, and Benoit U.S. Pat. No. 3,388,422 to a manual foot-press compressible of meat-containing shell on a flat-seat by an arcuate press brought-down from above, and Altman U.S. Pat. No. 3,251,091 to a horizontal revolving table having press-positions of upper and lower mating press-surfaces of conforming shapes of particular design, and Huebetter U.S. Pat. No. 3,921,256 providing, like Benoit patent-above, a flat horizontal base on which a meat containing crab rest while compressed by an upper arcuate press—here of a rocker-type arrangement.

SUMMARY OF THE INVENTION

In light of the preceding problems and difficulties of the crab meat-extracting industry, the present inventor began work to overcome and/or avoid problems and difficulties and disadvantages of the types noted above as general objects of the present invention.

As a principal object, the inventor worked to increase the yield of meat extracted from each crab meat-containing shell by way of experimentation with various approaches and structures and modifications thereof, resulting in the final method and apparatus that effectively achieve this object.

Another object has been the obtain a workable apparatus or machine and method by which the extracted meat is effective and cleanly separated from the debris-residual compressed shell to be discarded.

Another object has been to effect a workable apparatus or machine and method for rapidly extracting and collecting the extractable meat from meat containing crab-under-shell and to simultaneously separate and discard automatically the debris-residual crushed and compressed meatless shell.

Another object has been to obtain an aesthetically-appealing and palatable extracted crab-meat product by a novel apparatus or machine and method of extracting such meat from crab under-shell, and to do so economically and efficiently.

Another object has been to obtain a workable apparatus or machine and method for continuously and speedily and effectively maintaining clean conditions and preventing extracted crab meat from becoming mixed or contaminated with crushed shell of the shell previously and/or currently and simultaneously being pressed.

Another object is to obtain a workable apparatus or machine for extracting crab meat from crab meat-containing under-shell by use of adjustable and/or lockable alternate-positions of differing compressing pressures for optimizing prior-stated objects during extraction.

Another principal object is to obtain prior one or more objects by employment of uncomplicated and inexpensive structures or elements, and to make the practice of the method and use of the extraction equipment simple enough to be safely and effectively utilized by unskilled laborers of limited or little mechanical ability.

Other objects become apparent from the preceding and following disclosure.

One or more of preceding objects are obtained by the invention as herein described and typically illustrated in the Figures provided to enhance understanding but not limiting the invention thereto, there being many other embodiments possible but the present Figures concentrating on the preferred embodiments thereof.

Broadly stated, the method of the invention that may be most effectively practiced in the apparatus or machine of the invention, firstly removing the outer upper-shell from the meat-containing under-shell of the crab or other crustacean, and thereafter causing pincher rolls to revolve and feeding thereupon the residual meat-containing crab undershell, or undershell of other crustacean, into a bit of the revolving or moving surfaces of the revolving pincher rolls, whereby the crushed and/or compressed shell passes between and beyond the biting pincher rolls while the meat thereof is pressed forwardly and away from the bite of the pincher rolls, effectively separating physically the meat and the crushed or compressed shell that is moved simultaneously rearwardly from the extracted meat.

Preferably the method includes washing the residual meat-containing undershell after removing the outer top shell from the crab, and more preferably subsequent to the compression-extraction resulting from the feeding, steaming meat that is extracted, by applying steam directly to the extracted meat whereupon meat that is extracted from the main body undershell of the crab changes its color from a dull gray to a white appearance. In the method of extraction, facilitating the collection of the meat during extraction, and preventing the squeezed-out meat from becoming grasped by the rolls surfaces at the bite position of the pincher rolls and from thereby being dragged between the rolls with the crushed or compressed such that less of meat is avoided, prior to the feeding of meat-containing undershell or claws into the bite of the pincher rolls the revolvable pincher rolls are positioned at an angle of from about 30 degrees to about 120 degree, more preferably from about 50 degrees to about 85 degrees as measured from a horizontal (as shown in the Figures); accordingly, the squeezed-out meat falls downwardly forward of and free from the grasping bite of the pincher rolls. Upon the falling forwardly of the squeezed-out or extruded meat, the meat is guided by a guiding structure into a collection vessel of suitable size and shape. During the revolving of the squeezing surfaces during the revolving of the pincher rolls, the soiled portion is brushed and/or scraped to remove debris-residual crushed and/or compressed shell prior to the soiled surface(s) returning to the bite-position(s), whereby the newly-squeezed meat is maintained free and clean of particles of shell otherwise adhering to the prior-used portions of the pincher-rolls' surfaces.

Facilitating the practice of the method above-noted, the crab-meat extractor device includes a pair of pincher-rolls, preferably cylindrical in shape, and support structure supporting them in substantially parallel relationships; the opposing roller surfaces thereof are in juxtaposition to one-another positioned such that cleaned meat-containing crab or other crustacean is graspable and compressible between the pincher-rolls when the rolls are revolvably driven. The pincher rolls are positioned on the support structure at an angle as measured from a rearward point forwardly and angularly upwardly at an angle of from about 30 degrees to about 120 degrees measured from a horizontal, preferably at the above-noted about 50 degrees to about 85 degrees. Brushes, preferably revolvable brushes are mounted in brushing contact with the above-noted roller surfaces and are positioned to clean debris-residual from the roller surfaces subsequent to the pinching and compressing and/or crushing of the shell prior to return of the soiled surfaces to the pinching/compressing positions of the bite of the pincher rolls. Likewise, a separate scraper is preferably similarly positioned to scrape-away adhering debris-residual from the roller-surfaces, as previously stated.

Preferably there is a funnel or other collector guide-structure typically and preferably mounted on the support structure, suspended somewhat forwardly of and from about a mid-point of the bite below the pincher rolls, thusly positioned to catch and guide squeezed-out or extruded crab meat to a storage or catching vessel of desired or appropriate size and shape.

To maximize the efficiency of the extrusion of the crab meat such that maximum possible recovery is achieved, a portion of the support structure is pivoted on a remaining portion thereof, and an adjustable and lockable arm or rod extends therebetween for alterning the closeness or distance between the pincher rolls, in a preferred embodiment.

There is a drive mechanism including preferably an electric meter having preferably a foot-switch for ease of turning-on and turning off the revolving of the pincher rolls, particularly as a safety feature, connected to drive the pincher rolls either by direct or indirect drive. Typically and preferably the drive is through multiple belts, multiple belts being preferred to a single belt per driven roll, to reduce slippage during the driving while meat is being extruded simultaneous with a compressing and/or crushing of the meat-containing shell. Preferably the drive from the motor directly drives solely one of the pincher rolls, while the remaining other pincher is driven by contact with the driven-roll or by contact through the crab shell being compressed, as the case may be. The preferably revolvable brush and bristles thereof for each of the pincher rolls, is attached one to one pincher roll and a separate other one to the other pincher roll, for each pincher roll to revolve its contacting brush in a counter-revolving direction as the pincher roll itself is driven revolvably.

The invention can be better understood by making reference to the following figures.

THE FIGURES

Figure 3:

FIG. 3 in side perspective view illustrates a typical revolvable brush of the present invention.

Figure 4:
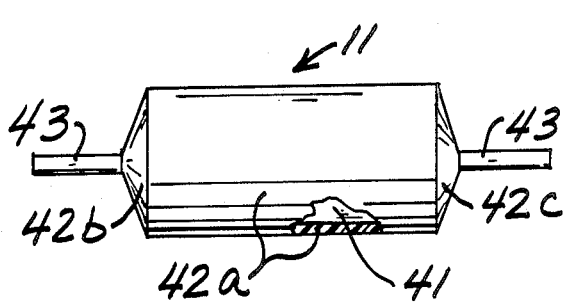

FIG. 4 illustrates a typically appearing pincher roller in side cross-sectional view.

Figure 5:
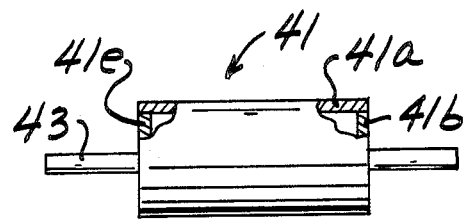

FIG. 5 illustrates the same roller as FIG. 4, in side view.

Figure 6:

FIG. 6 illustrates a flexible plastic or stainless-steel structure in elevation plan view before flexing and mounting, of the guide-structure for catching and guiding extruded crab meat to a retaining vessel.

Figure 7:
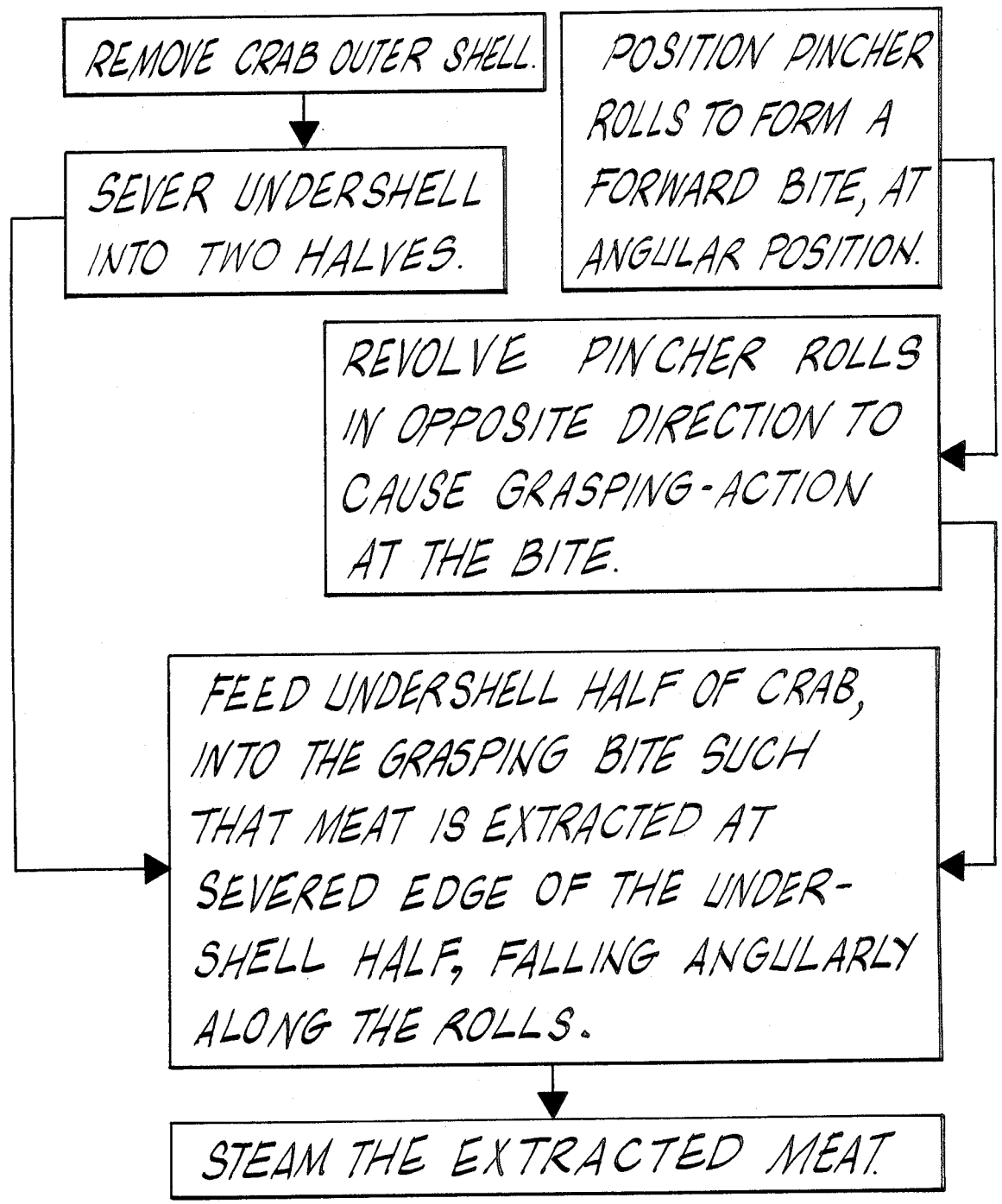

FIG. 7 in block diagram illustrates the method.

DETAILED DESCRIPTION OF THE INVENTION

In greater detail, all of the preceding figures illustrate different views and/or elements of the same common preferred embodiment of the invention. Accordingly, for the different Figures, the same indicia are utilized for commonly illustrated parts or elements.

Figure 1:
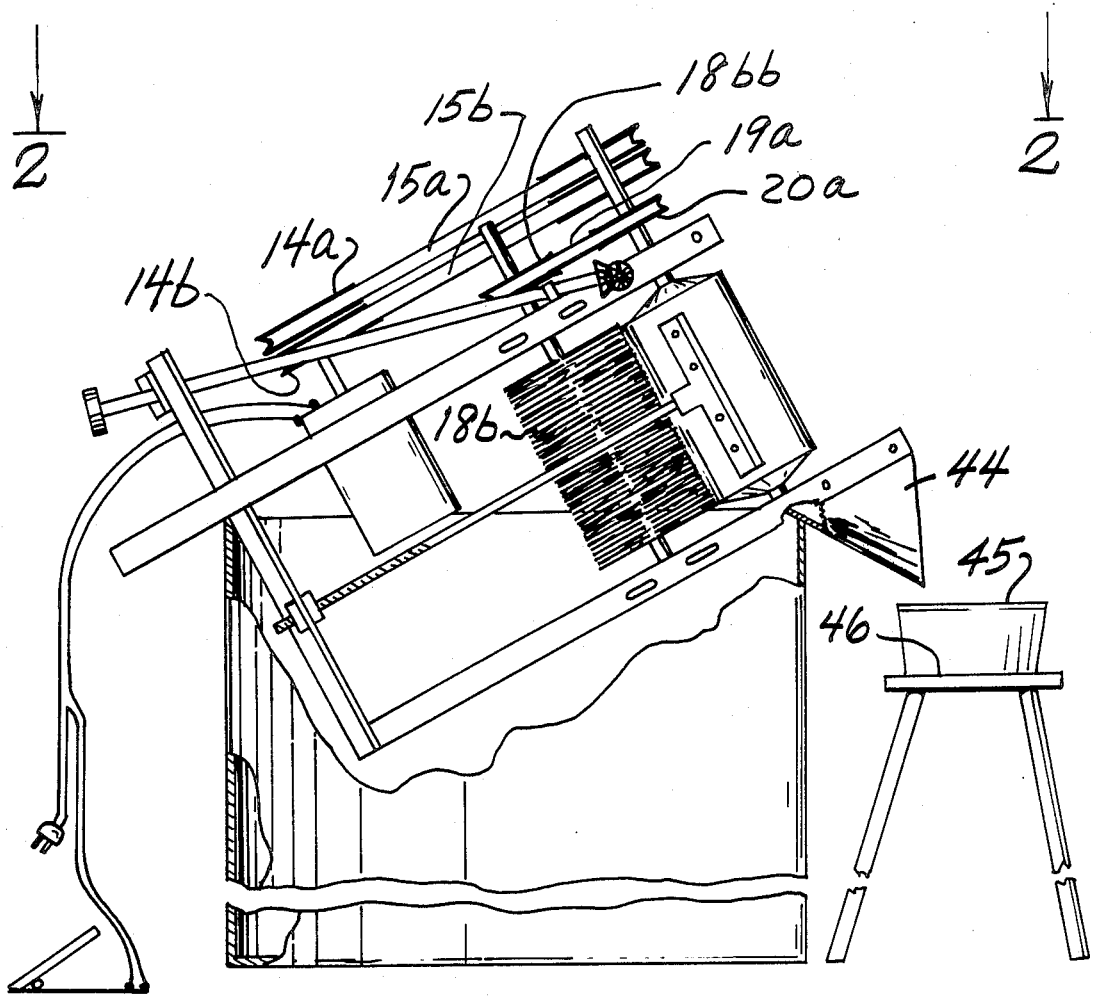
FIG. 1 illustrates a symbolic side view in partial cross-section, of the apparatus or machine of the present invention.
Figure 2:
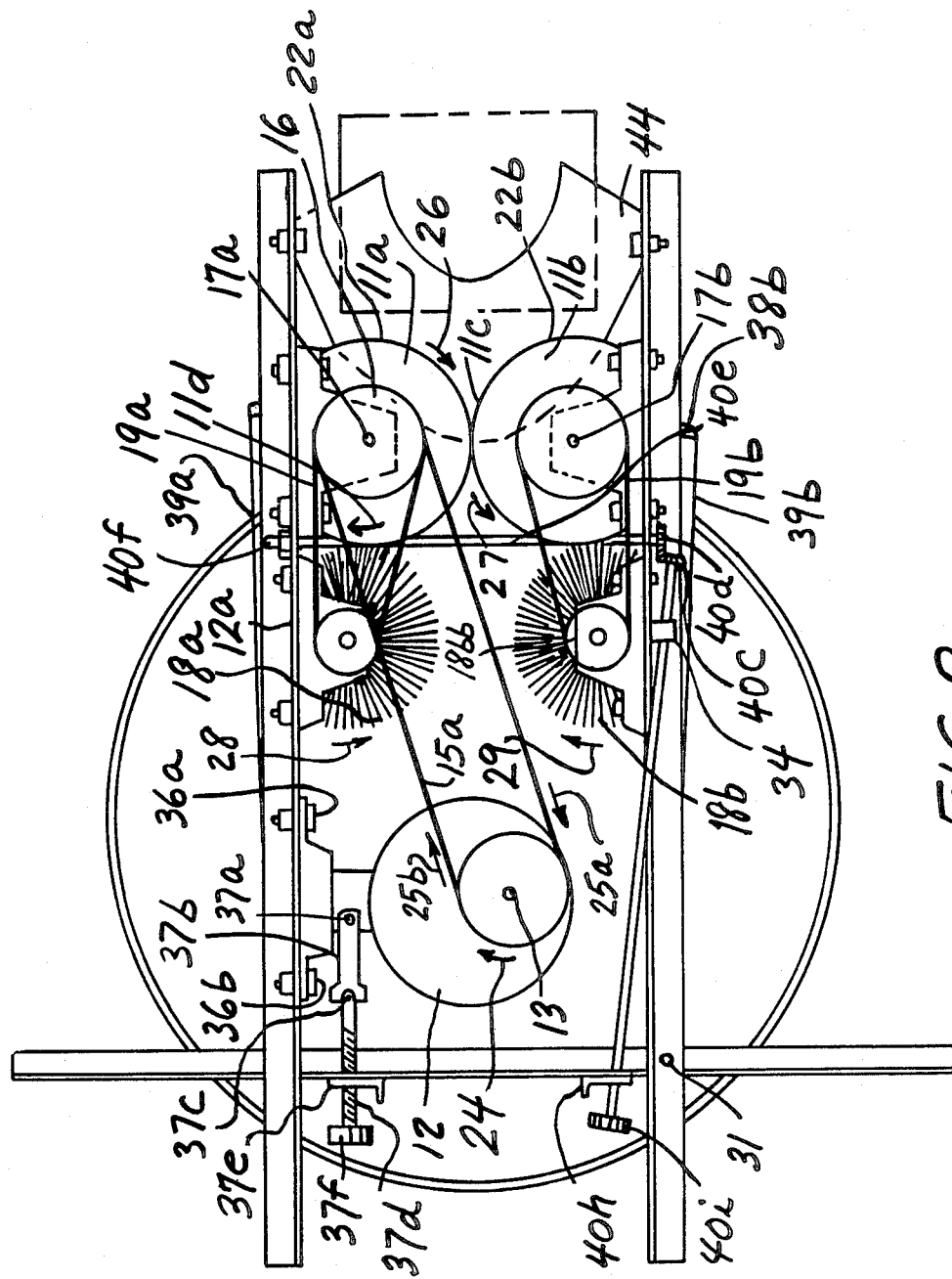
FIG. 2 illustrates a top view symbolically as taken along lines 2—2 of FIG. 1.

FIGS. 1 and 2 best illustrate the overall apparatus or machine.

The pincher rolls 11a and 11b have a typical bite point 11c at which point 11c meat containing undershell of crab is fed, normally after first breaking or cutting the undershell portion of the crab bilaterally into two halves with claws and legs intact, and feeding into the bite of the pincher rolls first the claw and legs. The crab may be cut bilaterally in half prior to removing the upper outer shell, preferably. The pincher rolls are normally locked tightly against each other prior to the feeding of the meat-containing shell(s) therebetween into the bite thereof.

The pincher roll 11a is driven by the electric driving motor 12 at a typical rate of revolutions of 6 R.P.M., the motor being typically a one-tenth horsepower motor as adequate. The motor drives a motor shaft 13 and its mounted drive pulley 14 by way of double belts 15a and 15b driving roll pulley 16 on roll-shaft 17a that mounts the roll 11a. Revolving brush 18a is driven by belt 19a which in-turn is driven by roll-drive pulley 20a; in like manner, revolving brush 18b is driven by belt 19b which in-turn is driven by a roll-drive pulley (not visible in figures) mounted on a shaft 17b revolvable with roll 11b that is driven by contact with roll 11a or through shell being compressed between the rolls.

When meat is extruded in direction 21 as the meat containing shell is fed into the bite 11c, the shell is pulled between the roller-surface 22a and 22b and the meatless compressed shell is released at location(point) 11d whereupon it falls freely into the garbage or trash container 23, as rolls 11a and 11b revolve in directions 11e and 11f respectively.

The motor 12 drives drive pulley 14 in direction 24 carrying the belt 14a in directions 25a and 25b to drive pulley 16 in direction 26 whereby roll 11a moves in direction 11d driving roll 11b in direction 27, and the revolvable brush 18a being driven in the direction 28 and the revolvable brush 18b being driven in the direction 29.

The roll 11b and revolvable brush 18b are mounted on a common support structure including the pivoted arm 30 mounted by pivotpin 31 on support structure 32. Adjustment rod 33 connected to pivoted arm 30 at about point 34, is lockably adjustable at adjustment mechanism-structure 35 on the support structure 32 as best seen in FIG. 2, whereby the position of roll 11b may be adjusted and set and locked relative to the position of roll 11a.

The motor 12 is slidably mounted on slide-mounts 36a and 36b and movable slidably sidewardly by pin 37a engaged by connector 37b attached to pin 37c on rotatable adjustment rod 37d that is male-threaded and adjustable axially within female-threaded structure 37e mounted on structure 32, by adjustment handle 37f, to tighten or loosen tension on the drive belts 14a and 14b.

The scraper 38a is mounted against roll 11a by support rod 39a mounted on support structure 32 (a general designation for all of this support structure), and scraper 38b is mounted on the pivoted support structure 30 (a general designation for all pivoted support structure) against roll 11b by support rod 39b.

The pressure of roll 11b against roll 11a and/or against shell being compressed between the two is dependent upon the pressure adjusting rod 33 through guide 34 mounted on movable support structure 30 and acting by its meshing gear 40c on bevel gear 40d of rod 40e also mounted to turn-in and carry-along the pivoted movable support structure 30 as male threads 40f turn in female threads of member 40g mounted on support guide 12a that is fixed-on the main support structure 32, by adjustment of the handle 40i alternately clockwise or counter-clockwise by rod-guide 40h fixed on support structure 32.

FIG. 4 typically represents a pincher roll 11 in partial cut-away, showing the hard under-support 41 typically of metal, having a covering typically of rubber-like material such as plastic 42a having at-least some resiliency preferably, also with plastic end coatings 42b and 42c, all mounted on its support rod 43 typically of metal or hard plastic or the like.

FIG. 5 illustrates a typical roll under-support 41 prior to its coating, typically made from a metal pipe 41a of about 4 inch outer-diameter having metal ends such as 41b and 41c, these structures being illustrated in cutaway cross-section, all mounted on the support-rod 43 thereof. The support-rod is supported in conventional bearing mountings (not shown) when mounted on the suppert structure 32 and 30 as rolls 11a and 11b previously described.

FIG. 3 shows a typical conventional type of rotary brush, in side view thereof, as typical brush 18 of the types illustrated as 18a and 18b conventionally mounted in bearing mountings (not shown).

FIG. 6 illustrates in a plan view thereof in a non-bent state, the typical guide structure 44, shown mounted in FIG. 1 as mounted on the general support structure 32. It will be noted in FIG. 2, that the position of the guide structure 44 is such that when mounted, the top portion thereof extends behind the bite position to approximately half-way through the point of compression which would correspond to an imaginary line extending between the centers of the pincher rolls 11a and 11b at the bottom thereof and beneath them, such that meat squeezed-from the shell being compressed is caught as it drops downwardly, to be guided to the collection vessel 45 on vessel-support 46.

Because other than above-described, the putting together of the parts of the apparatus or machine of this invention involve use of conventional parts or structures assembled in an ordinary way, such description and detail is deemed unnecessary for purposes of this disclosure, as being within ordinary skill.

The method of the invention is beneficially practiced utilizing the apparatus or machine of the invention, but in preferred embodiments of the method include steps not mechanically performed by the apparatus or machine of the invention.

In particular, in a typical practice of the method the crabs are severed into bilateral halves, killing the crabs prior to removal of the upper outer shells thereof, followed by removing of the outer shell, followed by conventional cleaning either by some mechanical mechanism but normally manually using appropriate conventional tools such as water from hoses, brushes, or the like. When the under shell containing the meat, and/or the claw-13 normally in a still-attached state, are cleaned, also preferably leaving the legs attached, the halve(s) is/are fed legs-first into the bite-position 11c previously described, whereupon the legs and/or claws become grasped between and by the pincher rolls 11a and 11b whereupon meat contained in the under shell and/or claws becomes extruded and/or squeezed-out to drop and travel in direction 21 within the guide 44, while the crushed and/or compressed shell continue to be carried by the pincher rolls 11a and 11b to releaseposition 11d where most of the debris-residual shell that is substantially meatless, drops downwardly into a garbage or other debris-collection vessel 23. The counter-revolving motion of the brushes 18a and 18b continuously cleans residual debris from their respectively-contacting rolls 11a and 11b as the case may be, and additional remaining debris stuck-to the rolls 11a and 11b is separated therefrom by action of the scrapers 38a and 38b, such debris removed by the brushes and scrapers falling into the debris-vessel 23.

The invention includes variations and modifications and substitution of equivalents as would be apparent to a person of ordinary skill.

I claim:

1. A crab meat extractor for extracting whole meat from crab undershell severed into severed half-undershells each having a severed edge, comprising in combination: pincher-rolls and support structure therefor supporting the pincher-rolls revolvably with axes of rotation thereof in substantially parallel relationships to each other having opposing bite-forming roller surfaces thereof in juxtaposition to one-another forming a forwardly-located position having a bite-location therebetween and said bite-forming roller surfaces being positioned such that cleaned meat-containing crab severed half-undershell is graspable of legs of the severed half-undershell by said pincher-rolls at said bite-location and meat-extractable at said forwardly-located position by compression of the crab severed half-undershell between said bite-forming opposing surface thereby to extrude crab meat in a direction forwardly of and away from said bite-forming roller surfaces, extrudable of the crab meat from said severed edge when the crab half-undershell is fed from a forward location into the forwardly-located position and said bite-location thereof as at-least one of the pincher-rolls is revolvably driven in a direction to form said bite-location, said parallel pincher rolls being further positioned with said axes of rotation and bite position at an angle ranging from about 30 degrees up to about 120 degrees relative to a horizontal such that extracted meat squeezed from said crab severed half-undershell falls from said bite-position toward the forward location and not passed between the bite-forming rolls, to fall downwardly free from grasp of the pincher-rolls surfaces to a collection point while crushed crab severed half-undershell passes rearwardly from the bite of the bite-forming pincher rolls and falls free behind the pincher-rolls, and drive means for driving at-least one of said pincher-rolls in a direction for pincher rolls-grasping of said cleaned meat-containing crab severed half-undershell at said bite-location.

2. A crab-meat extractor of claim 1, including pincher-rolls cleaning means for cleaning debris-residual from said-opposing-roller surfaces at locations such that the pincher rolls during revolving are cleanable after the crushed compressed shell passes between and before the soiled portion of the pincher-rollers revolve back to a bite-point whereby cleaned meat-containing crustacean is feedable to a bite of cleaned-surfaces of the pincher-rolls when the pincher rolls are revolvably driven by said driver means.

3. A crab-meat extractor of claim 2, in which said angle ranges between about 50 degrees and about 85 degrees as measured from the horizontal.

4. A crab meat extractor of claim 3, in which said pincher-rolls cleaning means includes at-least one brush having bristles thereof in brushing contact with a roll-surface of at least one of the pincher rolls.

5. A crab meat extractor of claim 4, in which said brush is a revolvable a brush revolvably driven by said driver means.

6. A crab meat extractor of claim 5, in which said drive means is connected to drive the revolvable brush revolvably in a revolving direction substantially counter to a direction of drive of the roll of which the brush is in cleaning contact.

7. A crab meat extractor of claim 6, in which there is one of said revolvable brushes in contact with each of said pincher rolls, on a one-to-one basis.

8. A crab meat extractor of claim 7, in which one of the pincher rolls is driven by the drive means and the revolving brush thereto is driven by a driving-connection to the driven one of the pincher rolls, and the remaining one of the pincher rolls is driven by contact through crustacean shell from which meat is being extracted between the pincher rolls, and the revolvable brush in contact with said remaining one of the pincher rolls is driven by a connecting means to the remaining one of the pincher rolls.

9. A crab meat extractor of claim 7, in which said pincher-rolls cleaning means includes scraper means for scraping debris-residual from at-least one of said-opposing bite-forming-rolls' surfaces at said locations.

10. A crab meat extractor of claim 9, in which the pincher-rolls cleaning means includes said scraper means is in contact with both of said pincher-rolls at said locations.

11. A crab meat extractor of claim 4, in which said pincher-rolls cleaning means includes scraper means for scrapping debris-residual from at-least one of said-opposing bite-forming-rolls' surfaces at said locations.

12. A crab meat extractor of claim 2, in which said pincher-rolls cleaning means includes scraper means for scraping debris-residual from at-least one of said-opposing bite-forming-rolls' surfaces at said locations.

13. A crab meat extractor of claim 10, including a collector guide-structure mounted on said support structure positioned to catch and guide extracted crab meat from a lower-bite position of said pincher-rolls to a lower site for collection thereof apart-from extraction debris carried through the bite of the pincher rolls.

14. A crab meat extractor of claim 12, including a collector guide-structure mounted on said support structure positioned to catch and guide extracted crab meat from a lower-bite position of said pincher-rolls to a lower site for collection thereof apart-from extraction debris carried through the bite of the pincher rolls.

15. A crab meat extractor of claim 11, including a collector guide-structure mounted on said support structure positioned to catch and guide extracted crab meat from a lower-bite position of said pincher-rolls to a lower site for collection thereof apart-from extraction debris carried through the bite of the pincher rolls.

16. A crab meat extractor of claim 1, including a collector guide-structure mounted on said support structure positioned to catch and guide extracted crab meat from a lower-bite position of said pincher-rolls to a lower site for collection thereof apart-from extraction debris carried through the bite of the pincher rolls.

17. A crab meat extractor of claim 1, including a compression means for adjusting and altering closeness or distance between said opposing bite-forming roller surfaces intermittently.

18. A crab meat extractor of claim 13, including a compression means for adjusting and altering closeness or distance between said opposing bite-forming roller surfaces intermittently.

19. A crab meat extractor of claim 18, in which said compression means comprises a pivoted portion of said support structure pivoted on a remaining portion of the support structure, one of the pincher rolls being mounted on the pivoted portion and another opposing-one of the pincher rolls being mounted on the remaining portion, and the compression means further including a latch structure having alternate positions for locking the pivoted portion and lockable at any one of the alternate positions.

20. A crab meat extractor of claim 1, in which said opposing bite-forming roller surfaces are a rubber-like material.

21. A crab-meat extractor of claim 19, in which said opposing bite-forming roller surfaces are a rubber-like material.

22. A method of extracting whole meat from crab undershell severed into severed half-undershells, comprising in combination: (1) removing a crab's outer upper-shell to leave an undershell; (2) thereafter, causing opposing pincher rolls positioned to form a forward elongated bite extending forwardly downwardly along an inclined line of contact between the opposing pincher rolls such that extracted meat is caused to move downwardly in a direction of a forward feed-location while meatless residual crab severed half-undershell is dragged through the rolls and is directed in a rearward direction away from said feed-location; (3) causing the rolls to revolve in a direction to form said forward elongated bite; (4) halving the undershell to form separate severed half-undershells each having a severed edge and an opposite edge from which legs extend; (5) feeding the opposite edge into the forward elongated bite such that crab meat is extruded from said severed edge in said direction of said forward feed-location apart from meatless residual crab severed half-undershell dragged through the rolls; (6) thereafter steaming said extracted meat.

23. A method of extracting meat from meat-containing cleaned crustacean shell of claim 22, including positioning said opposing pincher rolls with substantially parallel axes thereof at an angle of from about 30 degrees up to about 120 degrees as measured from a horizontal prior to said feeding.

24. A method of extracting meat from meat-containing cleaned crustacean shell of claim 22, including positioning said opposing pincher rolls with substantially parallel axes thereof at an angle of from about 50 degrees and about 85 degrees as measured from a horizontal prior to said feeding.

25. A method of extracting meat from meat-containing cleaned crustacean shell of claim 24, including collecting extracted meat from a position at a base-position below a lower end of the bite of said revolving pincher rolls, and washing said residual meat-containing crab under-shell after removing said outer upper-shell, prior to feeding the residual meat-containing crab into the forward bite.

* * * * *